United States Patent [19]

Hirozawa

[11] Patent Number: 4,743,393

[45] Date of Patent: May 10, 1988

[54] ANTIFREEZE CONCENTRATES AND COOLANTS CONTAINING HETEROPOLYMOLYBDATE COMPOUNDS

[75] Inventor: Stanley T. Hirozawa, Birmingham, Mich.

[73] Assignee: BASF Corporation, Parsippany, N.J.

[21] Appl. No.: 871,292

[22] Filed: Jun. 6, 1986

[51] Int. Cl.$^4$ .............................................. C09K 5/00
[52] U.S. Cl. ........................................ 252/75; 252/74; 252/387; 252/389.2; 252/389.3; 252/389.54
[58] Field of Search ................ 252/74, 75, 387, 389.2, 252/389.3, 389.54

[56] References Cited

U.S. PATENT DOCUMENTS

| | | | |
|---|---|---|---|
| 2,803,604 | 8/1957 | Meighen | 252/75 |
| 4,382,008 | 5/1983 | Boreland et al. | 252/75 |
| 4,382,870 | 5/1983 | Abel et al. | 252/74 |
| 4,452,715 | 6/1984 | Hirozawa | 252/75 |
| 4,455,248 | 6/1984 | Wood | 252/74 |
| 4,561,990 | 12/1985 | Darden | 252/74 |

OTHER PUBLICATIONS

Brasher et al., "Sodium Dodecamolybdophosphate as a Corrosion Inhibitor in Aqueous Solution," Brit. Corros. J. 1969, 4(2), 74–9.

Xu et al., "Study of Heteropolymolybdates as Water Corrosion Inhibitors," Huadong Huagong Xueyuan Xuebao 1981, (2), 13–18.

*Primary Examiner*—Robert Wax
*Attorney, Agent, or Firm*—Bill C. Panagos; Joseph D. Michaels

[57] ABSTRACT

The subject invention relates to a polyhydroxy alcohol-based antifreeze concentrate for engines containing aluminum parts which utilizes certain heteropolymolybdate compounds as corrosion inhibitors for aluminum parts. In addition, the antifreeze contains conventional components such as a buffer, silicate, and nitrate.

12 Claims, No Drawings

ANTIFREEZE CONCENTRATES AND COOLANTS CONTAINING HETEROPOLYMOLYBDATE COMPOUNDS

BACKGROUND OF THE INVENTION

1. Field of the Invention

This invention relates to polyhydroxy alcohol-based antifreeze concentrates and coolants. Conventional components are used except for certain heteropolymolybdate compounds.

2. Description of the Prior Art

Molybdates, phosphates, and silicates are well known components of antifreeze to inhibit various types of corrosion. These inhibitors can be used individually or as mixtures, but there is no apparent synergism which results from using mixtures.

Heteropolymolybdates are known compounds and have been used to inhibit the corrosion of caroon steel in water. See Xu et al, "Study of Heteropolymolybdates as Water Corrosion Inhibitors," *Chemical Abstracts*, Vol. 96, 129508h (1981).

SUMMARY OF THE INVENTION

The subject invention relates to polyhydroxy alcohol-based antifreeze concentrates for engines containing aluminum parts comprising:

(a) an effective corrosion inhibiting amount of a heteropolymolybdate compound having the following structural formula:

$$[X^{n+}Mo_{12}O_{40}]^{(8-n)-1}$$

where $X^{n+} = P^{+5}$ or $Si^{+4}$;

(b) a buffer compound in an amount such that the RA of the antifreeze concentrate is at least 10;
(c) from 0.1 to 1.0 weight percent of a nitrate, said weight percent based upon the total weight of the concentrate;
(d) water; and
(e) one or more polyhydroxyl alcohols such that the weight ratio of water to polyhydroxyl alcohol is from 0.1:100 to 10:100.

The heteropolymolybdates are effective inhibitors against solder corrosion and aluminum corrosion. Data suggests they provide more effective corrosion protection than could have been predicted when considering the amount of active metal bonded in the heteropolymolybdate structure.

DESCRIPTION OF THE PREFERRED EMBODIMENTS

The heteropolymolybdate compounds are known compounds[1] and are commercially available. Two of the best known, and, therefore, used on a preferred basis are 12-molybdophosphate and 12-molybdosilicate. Both of these compounds are available from AMAX Corporation. These compounds are used in an amount effective to inhibit the corrosion of aluminum metal parts. Generally, they are used in an amount of 0.1 weight percent to 1.0 weight percent, said weight percent based upon the total weight of the concentrate.

[1]See *Advanced Inorganic Chemistry*, F. A. Cotton and G. Wilkinson, pp 949–957, Interscience Puolishers, N.Y. (3rd edition, 1973).

The buffer compound used may be a phosphate, borate, or carbonate in any of their available forms. The amount of buffer used is such that the pH of the resulting coolant will have a reserve alkalinity (RA) of at least 5 for a coolant and at least 10 for a concentrate. RA is a measure of buffer capacity and is determined by titrating a 10 ml neat coolant sample (which is preferably diluted to 100 ml) with 0.1N hydrochloric acid to a pH of 5.5. The milliliters of acid used is equal to the RA of the coolant.

A water-soluble nitrate, which is preferably used in a corrosion inhibiting amount to provide specific corrosion protection of aluminum, can be derived from any inorganic nitrate compound which is capable of ionization to provide nitrate ions in sufficient concentration to passivate an aluminum or aluminum alloy surface. The water-soluble nitrate can be derived from nitric acid or an alkali metal or alkaline earth metal nitrate. Preferably, the water-soluble nitrate is an alkali metal nitrate. It is possible to add nitric acid to the aqueous liquid and subsequently add an alkali or alkaline earth metal hydroxide to neutralize the nitric acid and obtain an aqueous solution having a pH in the desired pH range. Useful water-soluble nitrate salts are sodium nitrate, potassium nitrate, lithium nitrate, cesium nitrate, rubidium nitrate, calcium nitrate, strontium nitrate, and magnesium nitrate. Preferably sodium or potassium nitrate is utilized. The proportion of nitrate ion utilized, calculated as sodium nitrate, is generally about 0.1 weight percent to about 1.0, preferably 0.1 weight percent to 0.5 weight percent based upon the weight of the antifreeze concentrate.

A water-soluble nitrite can be included optionally in the coolant compositions, antifreeze concentrates and metal corrosion inhibiting compositions of the invention as a specific corrosion inhibitor for cast iron and mild steel in contact with an aqueous liquid. Preferably, the water-soluble nitrites are alkali metal nitrites such as potassium and sodium nitrites. These corrosion inhibitors can be utilized generally in the antifreeze concentrates and coolant compositions of the invention in a proportion of about 0.05 weight percent to about 0.5 weight percent based upon the weight of the antifreeze concentrate.

The antifreeze concentrate preferably contains a water-soluble inorganic silicate represented by the average formula:

$$\frac{(M_2O)}{a}(SiO_2)_n$$

wherein n has a value from 0.5 to 4, or preferably from 1.0 to 2.5 and wherein M is a cation that forms a water-soluble silicate and a is the valence of the cation represented by M and has a value of at least 1. Illustrative of these silicates are the alkali metal orthosilicates wherein M is an alkali metal and n is 1, the alkali metal metasilicates, the alkali metal tetrasilicates, the alkali metal disilicates, and the tetra(organo) ammonium silicates. Specific examples of these silicates are potassium metasilicate, sodium orthosilicate, potassium disilicate, lithium orthosilicate, lithium metasilicate, lithium disilicate, rubidium disilicate, rubidium tetrasilicate. tetra(methyl)ammonium silicate, tetra(ethyl)ammonium silicate, phenyltrimethyl ammonium silicate, benzyltrimethyl ammonium silicate, guanidine silicate, and tetra(hydroxyethyl)ammonium silicate. The preferred silicates are sodium and potassium silicates, especially sodium metasilicate and potassium metasilicate. Particularly desirable are the commercially available sodium silicate aqueous solutions containing a weight ratio of silicon dioxide to sodium oxide of 1.8:1, 2.5:1, and 3.22:1.

The amount of silicate used in the antifreeze composition is generally from 0.1 to 1.0 weight percent, said weight percent being based upon the total weight of the antifreeze concentrate.

In addition to the water-soluble silicate, the coolant preferably contains a siloxane which acts as a silicate stabilizer. Representative examples of siloxanes which can be used in conjunction with the silicate are found in U.S. Pat. Nos. 4,362,644; 4,434,065; 2,968,643; 3,215,643; 3,341,469; 3,337,496; 3,312,622; 3,198,820; 3,203,969; 3,248,329; and 3,507,897; all of which are incorporated by reference into this application. The siloxanes are used in amounts such that the weight ratio of total silicate to siloxane in the antifreeze composition is from 2 to 10, preferably from 4 to 8.

The antifreeze concentrates utilize at least one water-soluble alcohol which is defined to include both monohydric alcohols (such as methanol, ethanol, and propanol) and polyhydric alcohols (such as ethylene glycol, dipropylene glycol, propylene glycol, diethylene glycol, triethylene glycol, and glycerol). The alcohol can also include hydrocarbon alcohols and alcohols containing ether linkages. Mixtures of alcohols are also useful in the compositions of this invention. In view of its desirable physical properties such as its low molecular weight and its low volatility, ethylene glycol is an especially useful alcohol in these compositions and mixtures of ethylene glycol and diethylene glycol are preferred. Especially preferred are mixtures of about 80 percent to about 98 percent ethylene glycol and 2 percent to about 20 percent of diethylene glycol all by weight and based upon the total weight of the antifreeze concentrate.

The antifreeze concentrates are adapted for economical shipment and storage and can be diluted with water to form coolants for use in the cooling systems of water-cooled internal combustion engines. The antifreeze concentrate has a weight ratio of water to polyhydroxy alcohol of 0.1:100 to 1:20, preferably from 1:50 to 1:20. The antifreeze coolant has a weight ratio of water to polyhydroxy alcohol of from 1:2 to 4:1, preferably from 1:1 to 3:1.

To provide for the corrosion protection of copper, brass and solder, the coolants preferably contain in a corrosion inhibiting amount at least one water-soluble salt of a triazole or thiazole compound. Representative useful thiazoles include the alkali metal salts such as the sodium, potassium, lithium, rubidium, and cesium salts of thiazole such as mercaptobenzothiazole, 4-phenyl-2-mercaptobenzothiazole, 4-methyl-2-mercaptobenzothiazole, and 5-methyl-2-mercaptobenzothiazole. Representative useful triazoles include the alkali metal salts of benzotriazole, tolyltriazole, benzotriazole carboxylic acid; alkyl esters of benzorriazole carboxylic acid having 1 to 8 carbon atoms in the alkyl group such as the methyl and butyl esters thereof; and benzotriazole derivatives having various substituents on the aromatic ring, i.e., $NO_2$, Cl, and $NH_2$.

At least one thiazole or triazole compound can be incorporated into the aqueous coolant or antifreeze concentrate composition or into the corrosion inhibiting composition intended for subsequent addition to the cooling system of an internal combustion system in the acid form of the thiazole or triazole. In the resulting alkaline solution of the coolant or antifreeze concentrate or corrosion inhibiting composition, the acid form is converted to the salt which is water soluble. The thiazole or triazole, calculated as the sodium salt, is incorporated into the coolant solurion and the antifreeze concentrate generally in the proportion of about 0.1 percent by weight to about 0.5 percent by weight based upon the weight of the concentrate. Preferably, the proporation of thiazole or triazole is about 0.05 weight percent to about 0.5 weight percent and most preferably about 0.1 weight percent to about 0.25 weight percent, all based upon the weight of the antifreeze concentrate. The weight percent of the thiazole or triazole is calculated so as to provide an equivalent ion concentration as would be provided by sodium mercaptobenzothiazole with respect to the thiazole compounds and sodium tolyltriazole with respect to the triazole compounds.

Other conventional metal corrosion inhibitors, such as water-soluble molybdates and benzoates, particularly the alkali metal salts thereof can be used for their known metal corrosion inhibiting effects. Other special additives such as antifoam agents, identifying dyes, pH indicators, sealants which prevent leakage of the coolant from the cooling system, anticreep agents which prevent seepage of the coolant into the crankcase of the internal combustion engine, and the like, can be added to the heat-transfer compositions of the invention.

The corrosion inhibited heat transfer compositions of this invention can be prepared in any convenient manner by adding at ambient temperature and pressure the required metal corrosion inhibitors to water optionally containing a water-soluble alcohol and various conventional additives for imparting special properties to the heat-transfer medium. The mixed liquid or solid metal corrosion inhibitor compositions can be prepared simply by combining dry or liquid forms of the components and mixing at ambient temperature and pressure until a uniform dry mixture or aqueous solution or dispersion of the components is obtained. Silicates in the absence of siloxanes, however, should not be exposed to a pH of <9.

Many metal corrosion-inhibiting compositions can be prepared in accordance with the teachings of the invention. The following compositions are, therefore, merely representative. Where not otherwise specified throughout this specification and claims, temperatures are given in degrees centigrade and parts, percentages, and proportions are by weight.

EXAMPLES

In the Examples which follow a base antifreeze was prepared having the following composition and an RA value of 7.7.

| Component | Amount (weight percent) |
|---|---|
| Ethylene Glycol | 93.5 |
| Diethylene Glycol | 5.0 |
| $NaNO_3$ | 0.5 |
| Borax.5 $H_2O$ | 1.0 |

Test antifreezes were prepared by adding various inhibitors to the base antifreeze. These formulations are described in Table I.

TABLE 1

| Example | Inhibitor | Amount of Inhibitor (weight percent) |
|---|---|---|
| 1 | 12-molybdophosphate | 1.0 |
| 2 | 12-molybdosilicate | 1.0 |

TABLE 1-continued

| Example | Inhibitor | Amount of Inhibitor (weight percent) |
|---|---|---|
| C-1 | $Na_2MoO_4.2H_2O$ | 1.0 |
| C-2 | $Na_2HPO_4$ | 1.0 |
| C-3 | $Na_2SiO_3$ | 0.5 |

A screening test was then conducted on the foregoing antifreezes according to glavanostaircase polarization method (GSCP) as described by S. T. Hirozawa in the article entitled "Galvanostaircase Polarization" in the *Journal of the Electrochemical Society*, Vol 130, No. 8, (August 1983), and in the paper delivered at the Corrosion 85 Symposium entitled "Corrosion Monitoring by Galvanostaircase Polarization" by S. T. Hirozawa, Paper No. 85, both of which are hereby incorporated by reference.

Essentially the test method involves passing incrementally a current through a solder which is immersed in the test antifreeze to determine its breakdown potential ($\Delta E_b$) which is related to the general corrosion rate of the solder. The higher $\Delta E_b$, the greater the inhibition against general corrosion. This test was conducted with three different types of solder whose various concentrations of metals is shown below:

|  | Pb % | Sn % | Ag % |
|---|---|---|---|
| Solder A | 96.5 | 3.0 | 0.5 |
| Solder B | 93.5 | 6.0 | 0.5 |
| Solder C | 70.0 | 30 | 0 |

$\Delta EE_b$ in Table II which follows is expressed in millivolts. The number in parentheses is the calculated $\Delta E_b$ which would have been expected based upon the amount of molybdate, phosphate, and silicate in the heteropolymolybdate compound used and the $\Delta E_b$ for an equivalent weight of these compounds determined separately, i.e., as in Examples C-1, C-2, and C-3.

TABLE II

| Antifreeze | Solder A ($\Delta E_b$) | Solder B ($\Delta E_b$) | Solder C ($\Delta E_b$) |
|---|---|---|---|
| 1 | 710 (140) | 430 (71) | 260 (98) |
| 2 | 170 (136) | 300 | 370 |
| C-1 | 140 | 65 | 80 |
| C-2 | 140 | 200 | 465 |
| C-3 | 50 | | |

The test results show that in all cases the experimental value of $\Delta E_b$ for the heteropolymolybdate was higher than the expected calculated value.

The test antifreeze was then tested for sand abrasion as follows. Two preweighed 1" sections of aluminum radiator tube stock were mounted on a specimen holder. They were vacuum-brazed by the usual heat cycle used in the fabrication of aluminum radiators. The specimen holders were then filled with about 900 milliliters of a solution made up from 1 part antifreeze in 5 parts 100-100-100 ASTM corrosion test water and 5 grams of casting sand were added. Solutions were heated and maintained at 190° F. and pumped at a nozzle velocity of 443 centimeters/second for 24 hours. The aluminum specimens were then removed from the holder and cleaned with chromic acid and reweighed. The weight loss is measured in milligrams. The numbers in parentheses are the calculated weight losses expected based upon the amounts of molybdate, phosphate, and silicate in the heteropolymolybdate and the weight loss results from these compounds when used separately. The test results are summarized in Table III.

TABLE III

| Antifreeze | Weight Loss (mg) |
|---|---|
| 1 | 20 (112) |
| 2 | 38 (112) |
| C-1 | 114 |
| C-2 | 38 |
| C-3 | 38 |

To test the stability of the heteropoly structure at a pH >4.5, the following experiment was conducted. A test solution was prepared having a pH of 8.5 containing 12-molydophosphate. The test solution was heat cycled four weeks (4 hours at 190° F. and 8 hours off). The sand abrasion test was then carried out at time 0, one week, two weeks, and four weeks on four different sample specimens. The results are given in Table IV.

TABLE IV

| Period of Heat Cycling | Weight Loss, mg |
|---|---|
| 0 | 36 |
| 1 week | 36 |
| 2 weeks | 28 |
| 4 weeks | 28 |

The results indicate that the 12-molydophosphate is effective at a high pH, and must, therefore, be stable contrary to expert opinion.

The embodiments of the invention in which an exclusive privilege or property is claimed are defined as follows:

1. A polyhydroxy alcohol-based antifreeze concentrate for engines containing aluminum parts comprising:
   (a) an effective corrosion inhibiting amount of a heteropolymolybdate compound having the following structural formula:

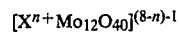

where $X^{n+} = P^{+5}$ or $Si^{+4}$;
   (b) a buffer compound in an amount such that the reserve alkalinity (RA) of the antifreeze concentrate is at least 10;
   (c) from 0.1 to 1.0 weight percent of a nitrate, said weight percent based upon the total weight of the concentrate;
   (d) water; and
   (e) one or more polyhydroxyl alcohols such that the weight ratio of water to polyhydroxyl alcohol is from 0.1:100 to 10:100.

2. The antifreeze concentrate of claim 1 wherein the heteropolymolybdate compound is selected from the group consisting of 12-molybdosilicate, 12-molybdophosphate, and mixtures thereof.

3. The antifreeze concentrate of claim 2 wherein from 0.1 weight percent to 1.0 weight percent of a water-soluble inorganic silicate is used as an additional component.

4. The antifreeze concentrate of claim 3 wherein a siloxane is also used in the formulation and is present in an amount such that the weight ratio of total silicate to eiloxane in the coolant is from 2 to 10.

5. The antifreeze concentrate of claim 4 wherein the heteropolymolybdate is used in amount of 0.1 percent by weight to 1.0 percent by weight, said percent by weight being based upon the total weight of the concentrate.

6. The antifreeze concentrate of claim 5 wherein additional corrosion inhibitors selected from the group consisting of nitrites, triazoles, and mixtures thereof are used in effective amounts.

7. An antifreeze coolant prepared by diluting the antifreeze concentrate of claim 1 with water such that the ratio of water to polyhydroxy alcohol is from 0.5:1 to 8:1.

8. An antifreeze coolant prepared by diluting the antifreeze concentrate of claim 2 with water such that the ratio of water to polyhydroxy alcohol is from 0.5:1 to 8:1.

9. An antifreeze coolant prepared by diluting the antifreeze concentrate of claim 3 with water such that the ratio of water to polyhydroxy alcohol is from 0.5:1 to 8:1.

10. An antifreeze coolant prepared by diluting the antifreeze concentrate of claim 4 with water such that the ratio of water to polyhydroxy alcohol is from 0.5:1 to 8:1.

11. An antifreeze coolant prepared by diluting the antifreeze concentrate of claim 5 with water such that the ratio of water to polyhydroxy alcohol is from 0.5:1 to 8:1.

12. An antifreeze coolant prepared by diluting the antifreeze concentrate of claim 6 with water such that the ratio of water to polyhydroxy alcohol is from 0.5:1 to 8:1.

* * * * *